3,061,548
METHOD OF CLEANING AlCl₃-HYDROCARBON COMPLEX FROM METALS

Andrew Dravnieks, Park Forest, Ill., assignor to Standard Oil Company, Chicago, Ill., a corporation of Indiana
No Drawing. Filed Nov. 26, 1958, Ser. No. 776,455
1 Claim. (Cl. 252—89)

This invention relates to cleaning a surface which is coated with an aluminum chloride hydrocarbon complex using an aqueous solution as the cleaning medium.

Aluminum chloride is now utilized in many operations involving hydrocarbons. The aluminum chloride may be used as a refining agent to improve the quality of materials such as lubricating oils. More widely, aluminum chloride is used as a catalyst for promoting isomerization reactions such as conversion of n-hexane to branched hexanes and alkylation of aromatic hydrocarbons with olefins. The use of aluminum chloride as a catalyst in the alkylation of benzene with olefins containing 9 to 15 carbon atoms, such as propylene tetramer to obtain alkylate suitable for detergent manufacture, has assumed some importance. In all of these uses wherein aluminum chloride and hydrocarbons are contacted, a complex of aluminum chloride and hydrocarbon is formed. These $AlCl_3$-hydrocarbon complexes range from viscous liquids to solid appearing materials.

The $AlCl_3$-hydrocarbon complexes adhere tenaciously to metal surfaces and other surfaces. Even though the complex may be decomposed by contact with water, the surface retains a considerable amount of oily material and solid decomposition products, which cannot be readily removed from the surface. The semisolid and solid-like complexes frequently can be removed from metal surfaces only by manual labor involving pick and shovel methods. Such removal involves a safety hazard as well as being slow and expensive.

An object of the invention is a method of cleaning a surface coated with an $AlCl_3$-hydrocarbon complex. A particular object is a method of cleaning a surface coated with an $AlCl_3$-hydrocarbon complex utilizing an aqueous cleaning medium. Other objects will become apparent in the course of the detailed description of the invention.

In the method of the invention, the surface, such as a metal vessel wall, having an $AlCl_3$-hydrocarbon complex adhering thereto, is contacted with an aqueous solution containing a nonionic surface active agent. The metal surface may be washed with a stream of the aqueous solution, or aqueous solution may be flowed past the surface, or the coated surface and the aqueous solution may be left in contact for a period of time to effect soaking of the complex by the solution.

The aqueous solution utilized in the method of the invention may be ordinary water or it may contain naturally occurring amounts of materials such as salt or minerals. In situations wherein corrosion products may need to be removed from metal surfaces, the aqueous solution may contain some acid or alkali to remove these corrosion products. The aqueous solution may also contain corrosion inhibitors such as rosin amines to reduce corrosion owing to the release of hydrogen chloride from the complex. In most situations, the aqueous solution will consist almost entirely of water.

The aqueous solution contains a nonionic surface active agent. It has been found that the nonionic detergents permit the clean removal of the complex from the surface, forming easily handled dispersions of both oil and solid hydrolysis products. It appears that any nonionic surface active agent which has substantial solubility in water may be utilized. It is to be understood that "substantial solubility" means the agent is soluble in water to a degree sufficient to permit the separation of the suspension by the method of this invention. The preferred class of nonionic agents are the condensation reaction products of ethylene oxide with alkylphenols having a total of from 6 to 12 carbon atoms present as alkyl substituents, fatty acids, aliphatic alcohols, esters, aldehydes, and amines. Any of these reactants which are utilized in commercial nonionic detergents of this type may be utilized in preparing a detergent suitable for use in the method of this invention. Illustrations of suitable agents of this preferred class are ethylene oxide and stearic acid; ethylene oxide and oleic acid; ethylene oxide, ethylamine, and stearic acid; ethylene oxide and castor oil; ethylene oxide and coconut oil fatty acids; ethylene oxide and cetyl alcohol; ethylene oxide and olelyl alcohol; ethylene oxide and abietinol; ethylene oxide and tall oil; ethylene oxide and monostearate of propylene glycol; ethylene oxide and the stearyl ester of ethanolamine; ethylene oxide and sorbitan mono-laurate; ethylene oxide and sorbitan monostearate; particularly suitable agents are the condensation reaction products of tall oil and about 15 moles of ethylene oxide per mole of said tall oil, and also, the condensation reaction product of diisobutylphenol and 9–10 moles of ethylene oxide per mole of said phenol.

The amount of defined agent present in the aqueous solution must necessarily be sufficient to permit the separation to take place. More than this amount, up to the solubility of the agent in the aqueous solution at contacting conditions, may be used. It has been found that, when utilizing the condensation reaction products of diisobutylphenol and ethylene oxide, particularly good results are obtained with aqueous solutions containing from about 0.1 to 0.3 weight percent of agent.

The $AlCl_3$-hydrocarbon complex, which is to be removed, may be any one of those complexes developed in the treatment of a hydrocarbon with aluminum chloride. The hydrocarbons may be paraffinic, olefinic, benzene type, and condensed aromatics such as naphthalene. The method of the invention has been found very suitable for removing from reactor walls and settling drums the $AlCl_3$-hydrocarbon complex formed in the preparation of detergent alkylate. For purposes of illustration, this alkylation process and the resulting complex are described. The alkylation is carried out by reacting benzene with an olefin containing from 9 to 15 carbon atoms, preferably an olefin polymer containing 12 to 15 carbon atoms, for example, propylene tetramer or butylene trimer. Between about 5 and 20 moles of benzene are present in the alkylation reactor per mole of olefin in order to obtain an alkylate mixture which is substantially the monoalkylate. The reaction is carried out in the presence of solid aluminum chloride particles, between about 1 and 10 weight percent of aluminum chloride based on olefin charged, and about between 0.1 and 1 weight percent of hydrogen chloride gas based on olefin, are used as the catalyst for the alkylation reaction. For example, 3 weight percent of $AlCl_3$ and 0.3 weight percent of HCl are used as the catalyst. A complex of aluminum chloride and benzene hydrocarbons forms in the alkylation reactor during the alkylation reaction. The alkylation hydrocarbon reaction mixture of benzene alkylate and complex is withdrawn from the reactor. The complex is separated from the alkylation hydrocarbon reaction mixture. The hydrocarbon reaction mixture is neutralized and distilled to recover benzene and product monoalkylate and some heavy alkylate. The $AlCl_3$-hydrocarbon complex by-product is a viscous, heavy liquid usually having a specific gravity slightly in excess of one.

The exact analysis of the complex is unknown since analytical procedures necessarily destroy the chemical composition. However, in general, the complex contains between about 30 and 35 weight percent of aluminum and chlorine calculated as AlCl₃ (theoretical). Also, the complex contains between about 35 and 45 weight percent of benzene. The remainder of the complex consists of higher boiling alkylated benzenes containing, it is believed, 2 or more alkyl groups. The higher boiling alkylated benzenes are a reddish brown color and are commonly designated as "red oil." Analysis of a typical $AlCl_3$-hydrocarbon complex showed: chloride, 25.9 weight percent; aluminum, 6.5 weight percent; benzene, 40.5 weight percent; and red oil, 27.1 weight percent; the specific gravity of the complex was 1.06. Upon decomposition of the complex with warm water, 21 volume percent was water soluble and 79 volume percent was water insoluble.

*Example*

A settling drum used for gravity separation of $AlCl_3$-hydrocarbon complex from the process described above was found to be coated with a thick layer of a very hard coky $AlCl_3$-hydrocarbon complex. (This material was removable from the metal surfaces only by hand cleaning, before the instant discovery described and claimed herein.) This drum was cleaned using an aqueous solution consisting of ordinary tap water containing 0.2 volume percent of the commercial detergent, which is a condensation reaction product of diisobutylphenol and 9–10 moles of ethylene oxide per mole of phenol. A rosin amine corrosion inhibitor was present in the solution to the extent of 0.1 volume percent.

Over a period of 3 hours, 2000 gallons of the aqueous solution were introduced into the drum, while circulation was maintained therein by means of a pump. The temperature of the solution in the drum gradually rose from 125° F. to 160° F. Circulation was maintained in the drum for approximately 2 hours; the temperature of the solution falling to about 130° F. When the temperature had returned to about 130° F., the contents of the drum were circulated vigorously by a pump for 8 hours. At the end of this time, the liquid contents of the drum, which were a muddy slurry of water, oil, and solid hydrolysis products, were dumped from the drum. About ⅔ of the complex had been removed from the vessel walls.

Another 1000 gallons of aqueous solution were charged to the drum. The solution was circulated for 8 hours and then permitted to soak for 8 hours. The muddy slurry was withdrawn from the drum; patches of complex were found adhering to the metal wall. These patches were readily removed by jetting solution onto them.

Fifteen cubic yards of complex were cleaned out of the drum at a cost of only 84 man hours of labor. This represents a very great saving in labor and a complete elimination of safety hazard to the men involved in the operation.

Thus having described the invention, what is claimed is:

A method for cleaning a metal surface coated with an adherent aluminum chloride-hydrocarbon complex which method comprises vigorously contacting said surface with an aqueous solution of about 0.1 to 0.3 weight percent of a nonionic surface active agent, which agent is the condensation reaction product of diisobutylphenol and 9–10 moles of ethylene oxide per mole of said phenol, at a temperature of 125°–160° F. and for a time sufficient to remove substantially all of said complex from said surface, and which complex consists of about 30–35 weight percent of $AlCl_3$ (theoretical), and the remainder benzene and higher boiling hydrocarbons.

References Cited in the file of this patent

UNITED STATES PATENTS

| | | |
|---|---|---|
| 1,970,578 | Schoeller et al. | Aug. 21, 1934 |
| 2,213,477 | Steindorff et al. | Sept. 3, 1940 |
| 2,952,571 | Freedman | Sept. 13, 1960 |

OTHER REFERENCES

"Soap and Chemical Specialties," article by Cook, May 1955, pp. 47–49, 89.